(12) United States Patent
Kong

(10) Patent No.: US 10,094,451 B2
(45) Date of Patent: Oct. 9, 2018

(54) DUAL MODE TENSIONER

(71) Applicant: Lingyuan Kong, Troy, MI (US)

(72) Inventor: Lingyuan Kong, Troy, MI (US)

(73) Assignee: Dayco IP Holdings, LLC, Troy, MI (US)

(*) Notice: Subject to any disclaimer, the term of this patent is extended or adjusted under 35 U.S.C. 154(b) by 296 days.

(21) Appl. No.: 15/189,230

(22) Filed: Jun. 22, 2016

(65) Prior Publication Data

US 2017/0002903 A1    Jan. 5, 2017

Related U.S. Application Data

(60) Provisional application No. 62/187,573, filed on Jul. 1, 2015.

(51) Int. Cl.
| | |
|---|---|
| *F02N 15/06* | (2006.01) |
| *F16H 7/12* | (2006.01) |
| *F16H 7/08* | (2006.01) |
| *F02N 15/02* | (2006.01) |
| *F02N 11/04* | (2006.01) |

(Continued)

(52) U.S. Cl.
CPC ........... *F16H 7/129* (2013.01); *F02N 15/022* (2013.01); *F16H 7/0848* (2013.01); *F02N 11/04* (2013.01); *F02N 11/0814* (2013.01); *F02N 15/08* (2013.01); *F16H 2007/0842* (2013.01); *F16H 2007/0846* (2013.01); *F16H 2007/0853* (2013.01); *F16H 2007/0865* (2013.01); *F16H 2007/0893* (2013.01)

(58) Field of Classification Search
CPC ................... F16H 7/129; F16H 7/0848; F16H 2007/0853; F16H 2007/0846
See application file for complete search history.

(56) References Cited

U.S. PATENT DOCUMENTS 3,374,686 A * 3/1968 Brewer ................... F16H 7/129
                                                              474/135
4,145,934 A * 3/1979 Sragal ..................... F16H 7/129
                                                              474/135

(Continued)

FOREIGN PATENT DOCUMENTS

| DE | 10 2013 203 957 | 2/2014 |
|---|---|---|
| DE | 10 2012 223 086 | 6/2014 |

(Continued)

OTHER PUBLICATIONS

PCT, International Search Report and Written Opinion, PCT/US2016/039786 (dated Sep. 19, 2016).

*Primary Examiner* — Jake Cook
(74) *Attorney, Agent, or Firm* — FisherBroyles, LLP; Susan M. Oiler

(57) ABSTRACT

A tensioner is disclosed. The tensioner includes an arm, a tong, and a clutch. The arm is rotatable about a first axis in an opposite direction. The arm includes at least one stopping element. The tong is selectively engaged with the at least one stopping element of the arm. The arm is substantially prevented from rotating in the opposite direction if the tong is engaged with the at least one stopping element. The clutch is operatively coupled to the arm. The clutch includes an engaged and a disengaged position. If the clutch is in the engaged position, then the tong is engaged with the at least one stopping element of the arm.

20 Claims, 5 Drawing Sheets

(51) Int. Cl.
*F02N 11/08* (2006.01)
*F02N 15/08* (2006.01)

(56) References Cited

U.S. PATENT DOCUMENTS

| | | |
|---|---|---|
| 4,563,167 A | 1/1986 | Foster |
| 4,758,208 A | 7/1988 | Bartos et al. |
| 5,803,850 A | 9/1998 | Hong et al. |
| 6,834,631 B1 | 12/2004 | Blackburn et al. |
| 9,103,411 B2 | 8/2015 | Wolf et al. |
| 2002/0086751 A1 | 7/2002 | Bonger et al. |
| 2003/0153420 A1 | 8/2003 | Rogers |
| 2004/0053719 A1* | 3/2004 | Gibson ................ F16H 7/1281 474/112 |
| 2006/0287146 A1 | 12/2006 | McVicar et al. |
| 2011/0070985 A1 | 3/2011 | Deneszczuk et al. |
| 2011/0070986 A1 | 3/2011 | Maguire et al. |
| 2013/0095967 A1 | 4/2013 | Wolf et al. |
| 2015/0369347 A1 | 12/2015 | Wolf et al. |

FOREIGN PATENT DOCUMENTS

| | | |
|---|---|---|
| DE | 10 2013 002 993 | 8/2014 |
| JP | 2003-172415 | 6/2003 |
| JP | 2011-74789 | 4/2011 |
| KR | 10-2013-0046260 | 5/2013 |

\* cited by examiner

DUAL MODE TENSIONER

RELATED APPLICATIONS

This application claims the benefit of U.S. Provisional Application No. 62/187,573, filed on Jul. 1, 2015.

TECHNICAL FIELD

This application relates to belt tensioners, and in particular to a dual mode belt tensioner that includes a clutch that substantially prevents the belt tensioner from rotating about an axis in an opposite direction.

BACKGROUND

The main purpose of a belt tensioner that automatically responds to fluctuations in the movements of an endless belt is to prolong the life of the belt itself, or of engine components such as accessories operating in conjunction with the belt. Belt tensioners are typically used in front-end accessory drives in an engine. In an effort to improve the fuel economy of the engine, a vehicle may be equipped with a belt-driven starter generator (BSG). The BSG may eliminate the need for a starter motor, and may also provide low-cost hybrid capabilities such as, for example, start-stop and power assist in a vehicle.

In addition to normal alternator functions, the BSG may also act as a motor to crank the engine of the vehicle. When acting as a crank, the BSG may act as a driver pulley while a crankshaft of the engine acts as a driven pulley. Thus, because the crankshaft is actually operating as a driven pulley, the tensioning requirements of the endless belt may actually be reversed when compared to the tensioning requirements of the endless belt operating under normal conditions. However, when the BSG cranks the engine, which is with a force of great magnitude, the endless belt tends to jerk or suddenly rotate the tensioner in a direction opposite to the tensioner's normal working direction. Conventional spring-loaded tensioners currently available may not be able to resist rotation in the opposite direction when the BSG operates as the driver pulley.

In one approach to meet the tensioning requirements of the endless belt in a BSG system, two tensioners may be provided. Alternatively, a single tensioner with two arms and two pulleys may be used instead. However, the tensioning effects of two tensioners tend to cancel one another. Moreover, adding an extra tensioner or extra components tends to add cost, weight, and complexity to a vehicle. Accordingly, there is a continuing need in the art for a simple, cost-effective tensioner that provides the required tensioning when the crankshaft is operating as either a driven or a driving pulley.

SUMMARY

In one embodiment, a tensioner is disclosed. The tensioner comprises an arm, a tong, and a clutch. The arm is rotatable about a first axis in an opposite direction. The arm includes at least one stopping element. The tong is selectively engaged with the at least one stopping element of the arm. The arm is substantially prevented from rotating in the opposite direction if the tong is engaged with the at least one stopping element. The clutch is operatively coupled to the arm. The clutch includes an engaged and a disengaged position. If the clutch is in the engaged position, then the tong is engaged with the at least one stopping element of the arm.

In another embodiment, a belt-driven starter generator (BSG) system is disclosed. The BSG system includes an engine having a crankshaft, a starter/generator, an endless power transmitting element, and a tensioner. The endless power transmitting element provides power transmission between the crankshaft and the starter/generator. The BSG system includes a running mode and a cranking mode. The starter/generator operates as a starter motor and restarts the engine based on a predetermined engine-start condition in the cranking mode. The tensioner substantially resists motion in an opposite direction created by the endless power transmitting element as the BSG system operates in the cranking mode. The tensioner comprises an arm, a tong, and a clutch. The arm is rotatable about a first axis in an opposite direction. The arm includes at least one stopping element. The tong is selectively engaged with the at least one stopping element of the arm. The arm is substantially prevented from rotating in the opposite direction if the tong is engaged with the at least one stopping element. The clutch is operatively coupled to the arm. The clutch includes an engaged and a disengaged position. If the clutch is in the engaged position, then the tong is engaged with the at least one stopping element of the arm.

DETAILED DESCRIPTION

Figure 1:
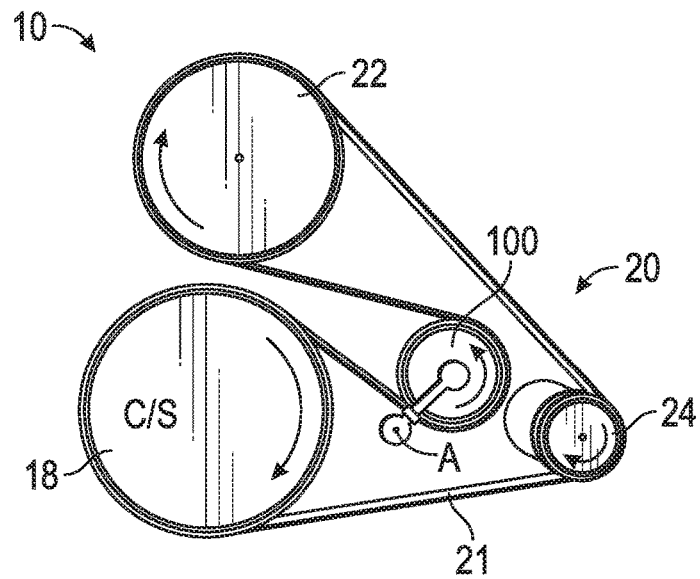
FIG. 1 is a front view of an engine including a belt-driven starter generator (BSG) system, which utilizes an embodiment of a tensioner.

The following detailed description will illustrate the general principles of the invention, examples of which are additionally illustrated in the accompanying drawings. In the drawings, like reference numbers indicate identical or functionally similar elements.

Referring now to FIG. 1, an engine having a crankshaft 18 is generally indicated by the reference numeral 20 and utilizes a belt-driven starter generator (BSG) system 10. The BSG system includes an endless power transmitting element 21 for driving a plurality of driven accessories or an idler pulley 22, a starter/generator 24, and a belt tensioner, generally designated as 100. The starter/generator 24 may operate as either a starter motor, or as a generator, and is explained in greater detail below.

The BSG system 10 may include two modes of operation, which include a running mode and a cranking mode. When the BSG system 10 operates in running mode, the engine 20 may operate by combusting fuel or another energy source, and the starter/generator 24 may operate as a traditional alternator. Also, the tensioner 100 may act to provide the necessary or required tension to substantially prevent slippage of the endless power transmitting element 21 and allows for the endless power transmitting element 21 to provide smooth power transmission. When the BSG system 10 operates in cranking mode, the starter/generator 24 operates as a starter motor, and may restart the engine 20 based on a predetermined engine-start condition existing. When operating in the cranking mode, the endless power transmitting element 21 tends to jerk or suddenly rotate the tensioner 100 in an opposite or counterclockwise direction about a first axis A (seen in FIG. 2). As explained in greater detail below, the tensioner 100 substantially resists the sudden counterclockwise motion created by the endless power transmitting element 21 when the BSG system operates in the cranking mode. It is to be appreciated that while a counterclockwise direction is described in the application, this description should not limit the tensioner 100 to resist rotation in only the counterclockwise direction. Instead, in another embodiment the tensioner 100 may normally work in the counterclockwise direction, and instead the tensioner 100 may be jerked in the clockwise direction. Thus the tensioner 100 may resist rotation in the clockwise direction instead.

Figure 2:
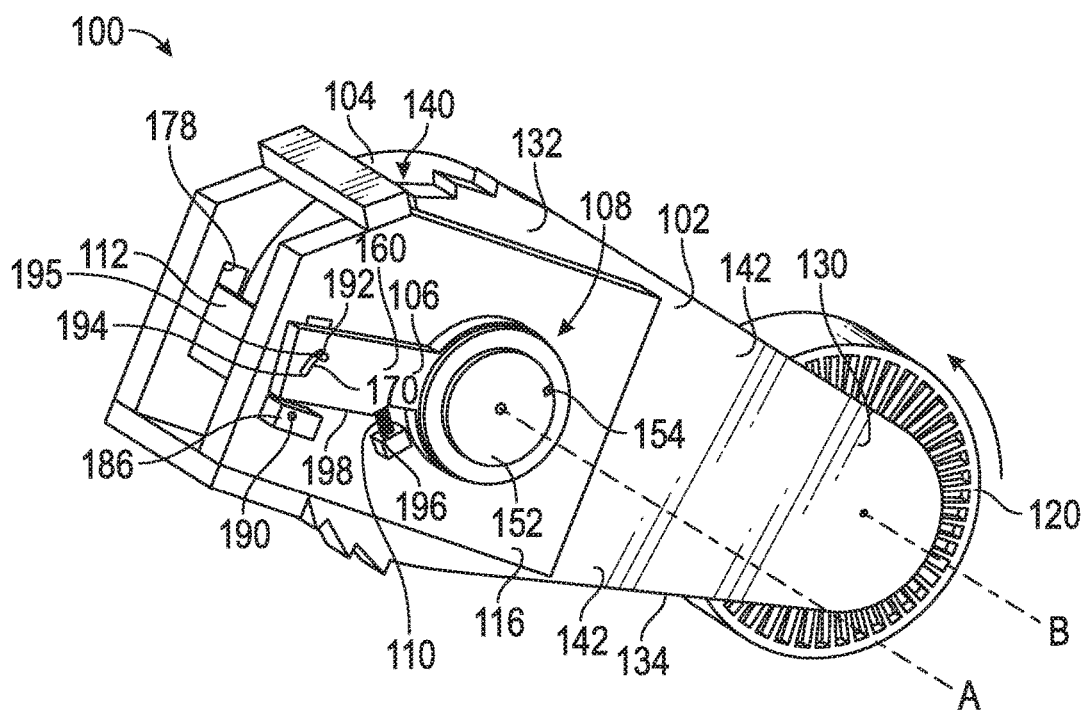
FIG. 2 is an elevated perspective view of the tensioner shown in FIG. 1, where the tensioner includes a clutch.
Figure 3:
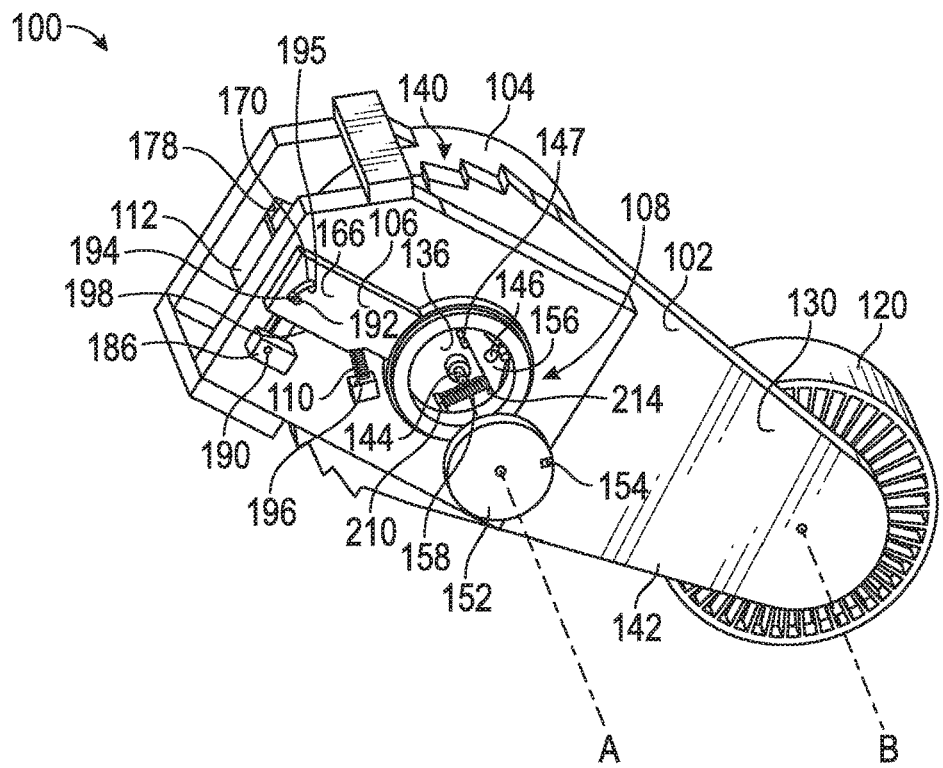
FIG. 3 is an elevated perspective view of the tensioner shown in FIG. 1, where a weight of the clutch is removed.
Figure 4:
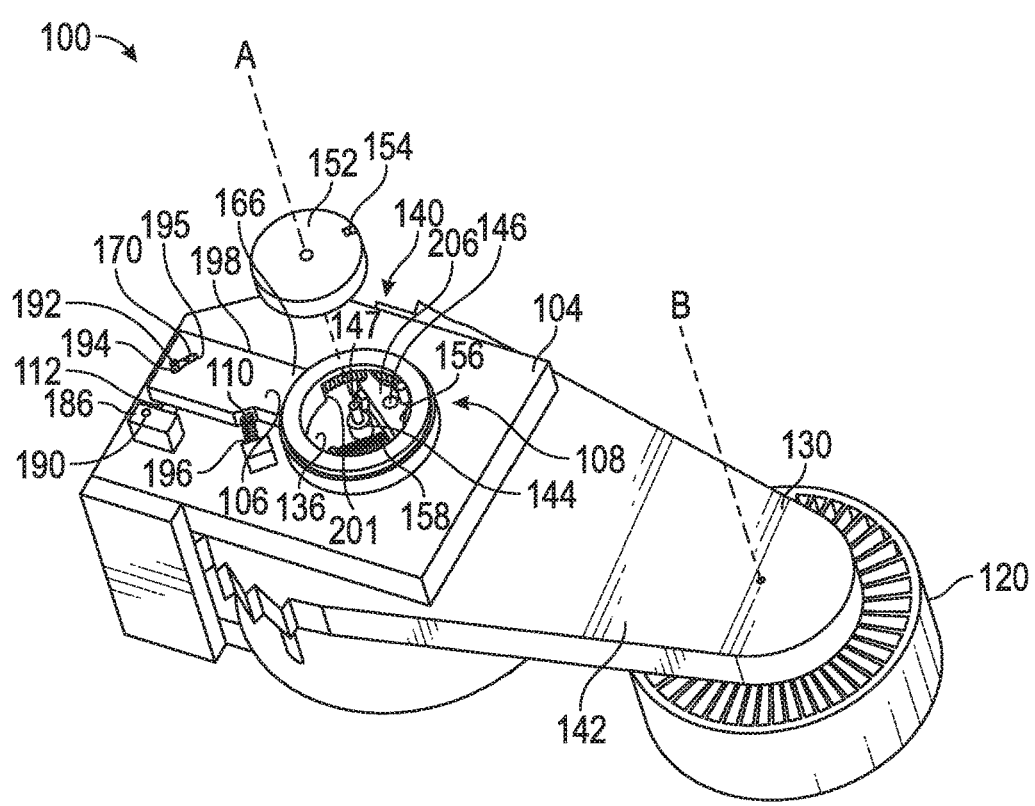
FIG. 4 is an elevated view of the tensioner shown in FIG. 1, where the weight has been removed.

FIGS. 2-4 are elevated perspective views of the tensioner 100. The disclosed tensioner 100 may act as a dual-mode tensioner that provides the required tension to prevent slippage of the endless power transmitting element 21 (FIG. 1) when the BSG system 10 operates in running mode. Furthermore, the tensioner 100 may also act to substantially resist counterclockwise motion about the first axis A when the BSG system 10 operates in cranking mode. The tensioner 100 includes a tensioner arm 102 rotatable about the first axis A. The tensioner 100 also includes a tensioner case 104, a cam 106, a clutch 108, a cam spring 110, a stopping element or tong 112, and a support member 116. A pulley 120 may be rotatably mounted to a first end 130 of the arm 102 for rotation about a second axis B. The second axis B may be spaced from and parallel to the first axis A. The pulley 120 may be coupled to the arm 102 with a fastener (not illustrated) such as, for example, a bolt, screw, pin, or rivet.

The tensioner case 104 may be used to contain one or more internally mounted torsion springs (not illustrated). The torsion spring is operatively coupled between the arm 102 and the tensioner case 104 so as to force the first end 130 of the arm 102 against the endless power transmitting element 21 (FIG. 1) and, in turn, to provide sufficient tension force, via the pulley 120, on the endless power transmitting element 21 when the engine 20 operates in running mode. In one embodiment, a damper or damping mechanism, for example a frictional damper, may be incorporated with the tensioner 100.

Figure 5:
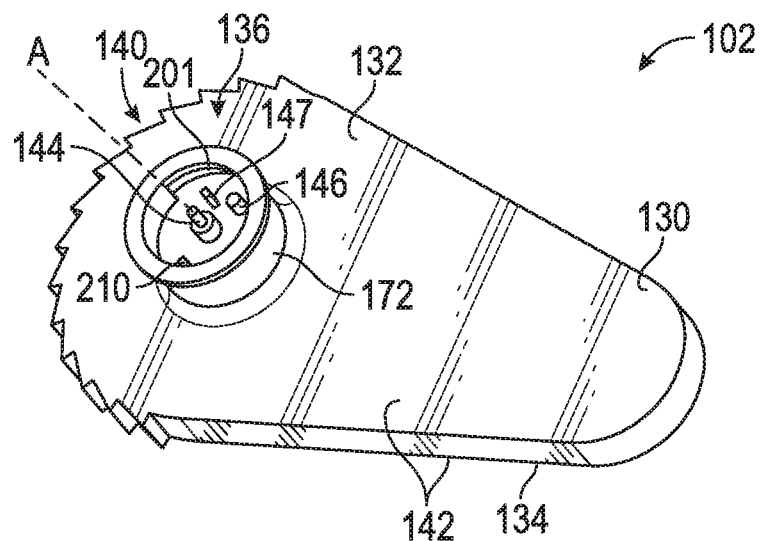
FIG. 5 is an illustration of the arm shown in FIGS. 2-4, where the arm includes a plurality of teeth.

Referring to both FIGS. 2 and 5, the arm 102 defines the first end 130, a second end 132, an outer perimeter 134, and a raised cavity or recess 136. A series of stopping elements or teeth 140 may be disposed along the outer perimeter 134 of the arm 102, along the second end 132. In the exemplary embodiment as seen in the figures, the teeth 140 may include a generally saw-tooth profile. The recess 136 may be disposed along one of the sides 142 of the arm 102. The recess 136 includes a hub 144 that projects outward from the side 142 of the arm 102. In the embodiment as shown, the hub 144 may be aligned with the first axis A of the tensioner 100. As seen in FIG. 5, the hub 144 may be surrounded by a retaining feature 146 and a protrusion feature 147, which both project outward from the side 142 of the arm 102.

Referring to FIGS. 2-5, in one embodiment the recess 136 may include a substantially circular or rounded profile. The recess 136 of the arm 102 may be shaped to receive a weight 152 (shown in FIGS. 2-4). The weight 152 acts to enclose or hide interior components of the clutch 108. Referring to FIGS. 3-4 and 6-7, the clutch 108 includes the weight 152, the cam spring 110, a lever 156, a clutch spring 158, the cam 106, and the tong 112. As seen in FIGS. 3-4, the recess 136 of the arm 102 may contain the clutch spring 158 and the lever 156. In the embodiment as shown, the clutch spring 158 is a compression spring, however it is to be understood that any other biasing element may be used as well. The clutch 108 may be a centrifugal clutch that is engaged and disengaged based on operation of the BSG system 10 (FIG. 1). When the clutch 108 is engaged, the tong 112 may engage with one of the teeth 140 of the arm 102, thereby substantially preventing counterclockwise rotation of the tensioner 100 about the first axis A.

The weight 152 may be constructed of a relatively heavy material such as, for example, lead. The weight 152 may define a slot 154. The slot 154 of the weight 152 is shaped to receive an outward projecting pin 204 (best seen in FIG. 7) of the lever 156. It is to be appreciated that because the weight 154 is constructed of a relatively heavy material such as lead, the weight 154 has a tendency to remain static, and has a relatively high angular inertia. Thus, because the weight 152 has a relatively high angular inertia, the clutch 108 may not inadvertently engage if relatively small oscillations are experienced by the arm as the BSG system 10 operates in running mode. It should be appreciated that the clutch 108 is only engaged if an angular acceleration of the arm 102 in the counterclockwise direction caused by the jerking of the endless power transmitting element 21 is of a predetermined magnitude. In other words, the angular acceleration of the arm 102 in the counterclockwise or opposite direction is great enough to engage the clutch 108 if the BSG system 10 is operating in the cranking mode.

Figure 6:
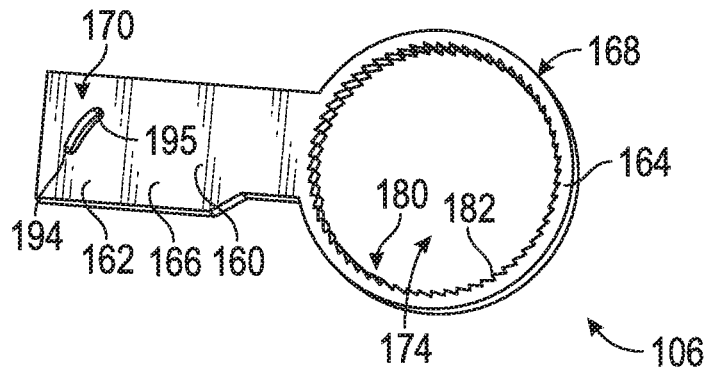
FIG. 6 is an illustration of the cam shown in FIGS. 2-4.
Figure 7:
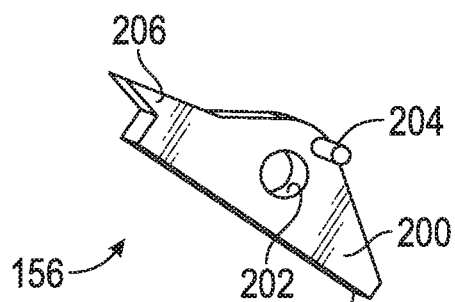
FIG. 7 is an illustration of the lever shown in FIGS. 2-4.
Figure 8:
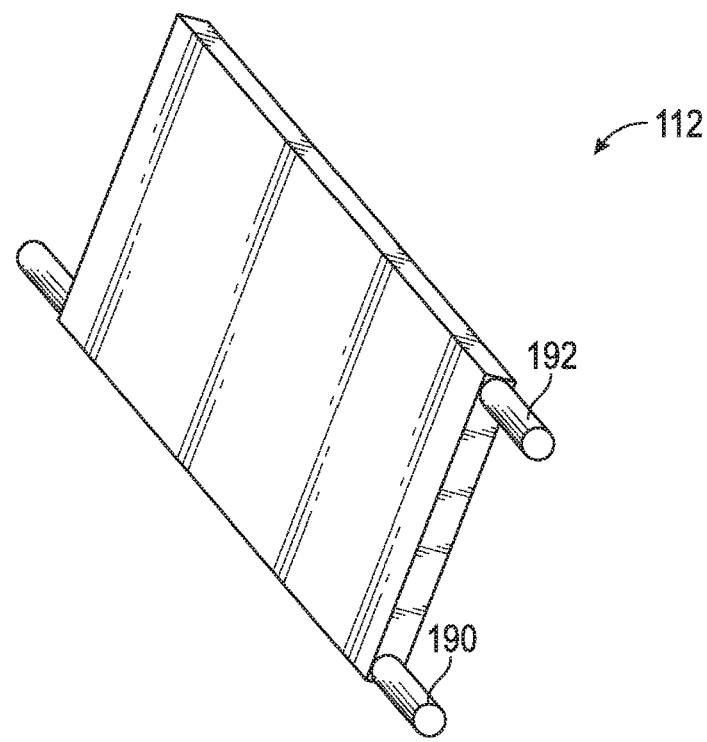
FIG. 8 is an illustration of the tong shown in FIGS. 2-4.

Referring to FIGS. 3-4 and 6, the cam 106 includes a body 160. The body 160 of the cam 106 defines a first end 162 and a second end 164. A cam portion 166 is located at the first end 162 of the cam 106 and a rounded portion 168 is located at the second end 164 of the cam 106. The cam portion 166 of the cam 106 may define a slot 170. The rounded portion 168 of the cam 106 may define a cavity 174 that is shaped to fit around an outer circumferential surface 172 of the recess 136 of the arm 102 (FIG. 5). A series of teeth 180 may be disposed along an interior surface 182 of the recess 174. As seen in FIG. 6, the teeth 180 of the cam 106 may include a generally saw-tooth profile, however it is to be understood that this profile is merely exemplary in nature and other types of tooth profiles may be used as well.

Figure 9:
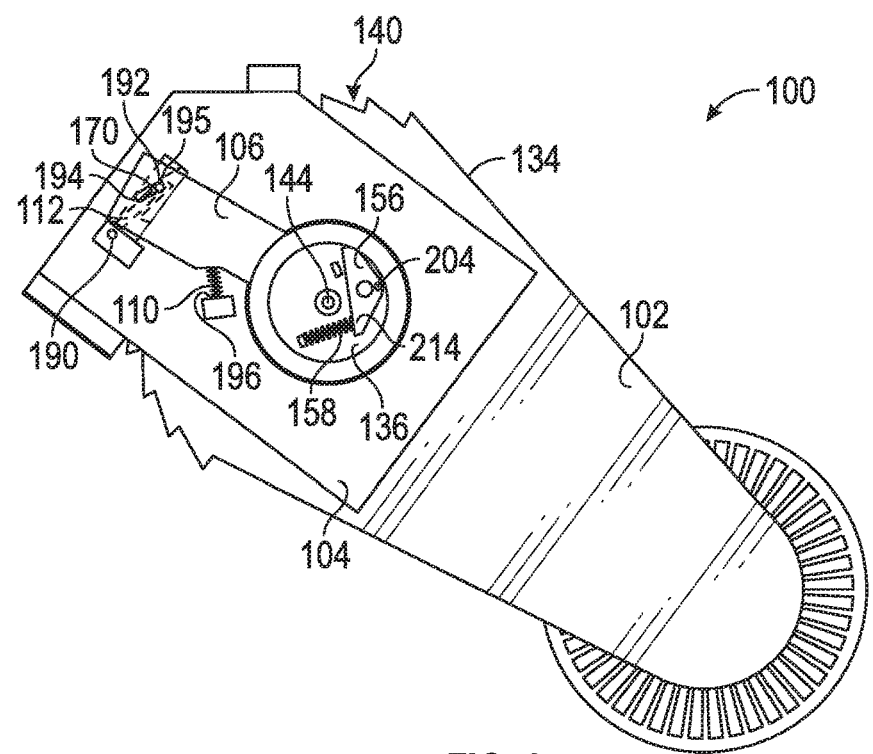
FIG. 9 is an illustration of the tensioner, where a clutch is engaged and the tong is engaged with one of the teeth of the arm.
Figure 10:
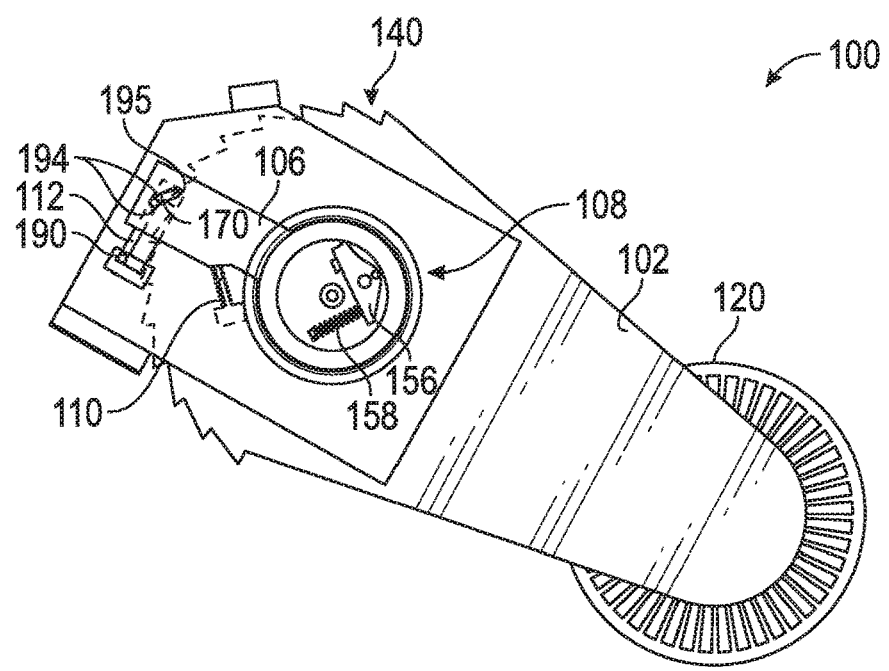
FIG. 10 is a side of the tensioner, where the clutch is disengaged and the tong is no longer engaged with one of the teeth of the arm.
Figure 11:
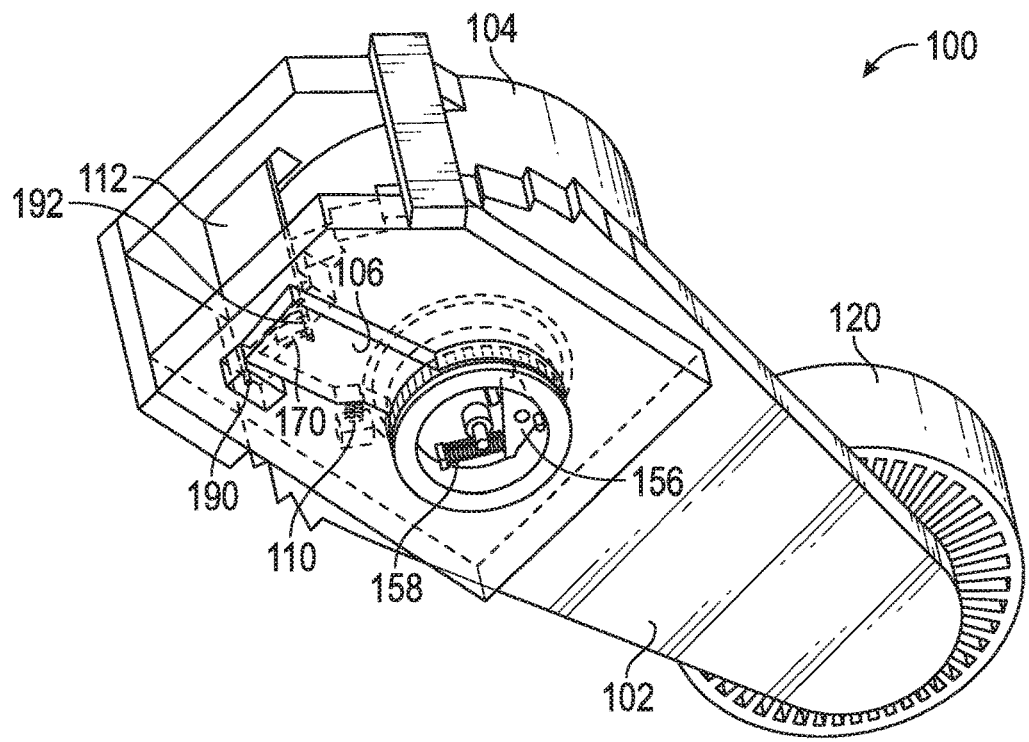
FIG. 11 is an elevated view of the tensioner shown in FIG. 9, where the clutch is engaged.

Referring to FIGS. 2-5 and 8, the tong 112 may be disposed within the tensioner case 104. Specifically, the tong 112 may be disposed in a transverse direction, and fits within a slotted portion 178 of the tensioner case 104. The tong 112 may be pivoted within the slotted portion 178 of the tensioner case 104, about a first pin 190. The tong 112 also includes a second or stop pin 192. The first pin 190 of the tong 112 may be received by a corresponding aperture 186 within the tensioner case 104. The stop pin 192 of the tong 112 may be shaped to slide within the slot 170 defined by the cam 106. More specifically, as seen in FIGS. 3, 4, 10 and 11, the stop pin 192 of the tong 112 may abut against a first end 194 of the slot 170 of the cam 106 if the clutch 108 is disengaged (i.e., the BSG system 10 is operating in running mode). Referring to FIG. 9, if the clutch 108 is engaged, the stop pin 192 of the tong 112 may abut against a second end 195 of the slot 170 of the cam 106. Once the stop pin 192 of the tong 112 abuts against the second end 195 of the slot 170, the tong 112 is now positioned within the tensioner 100 to selectively engage with one of the teeth 140 disposed along the outer perimeter 134 of the arm 102. It should be appreciated that the clutch 108 is engaged when the BSG system 10 (FIG. 1) is operating in the cranking mode.

Referring back to FIGS. 3-4, the cam spring 110 may be wedged between a stopper surface 196 of the tensioner case 104 and an outer perimeter 198 of the cam portion 166 of the cam 106. The cam spring 110 may exert a biasing force upon the cam 106 in the counterclockwise direction. In the embodiment as shown, the cam spring 110 is a compression spring, however it is to be understood that any other biasing element for exerting the biasing force upon the cam 106 may be used as well.

Referring to FIGS. 3-8, the lever 156 may include a body 200. The body 200 of the lever 156 defines a cavity 202, the outward projecting pin 204, and a tip portion 206. As explained in greater detail below, when the BSG system 10 (FIG. 1) is operating in cranking mode, the tip portion 206 of the lever 156 may engage with one of the teeth 180 located around the interior surface 182 of the cam 106. With specific reference to FIG. 5, the raised cavity 136 of the arm 102 defines a slotted opening 201 that extends around a portion of the circumference of the raised cavity 136. The slotted opening 201 of the arm 102 allows for the teeth 180 of the cam 106 to be exposed, thereby allowing the tip portion 206 of the lever 156 to engage with one of the teeth 180. This engagement between the tip portion 206 of the lever 156 and the cam 106 may urge the cam 106 to rotate about the first axis A of the tensioner 100 in the counterclockwise direction. However, during running mode, the tip portion 206 of the lever 156 is disengaged with the teeth 180 located around the interior surface 182 of the cam 106.

Continuing to refer to FIGS. 3-8, the cavity 202 of the lever 156 (FIG. 7) may be shaped to receive the retaining feature 146 that projects outward from the side 142 of the arm 102 (FIG. 5). The lever 156 may rotate about the retaining feature 146 received by the cavity 202. The lever 156 may be positioned within the recess 136 of the arm 102. The clutch spring 158, which is also positioned within the recess 136 of the arm 102, may be wedged between a stopper surface 210 disposed along one of the sides 142 of the arm 102 and an end 214 of the lever 156. The clutch spring 158 may exert a biasing force against the end 214 of the lever 156, thereby causing the lever 156 to press against the protrusion feature 147 on the arm 102, and the tip portion 206 of the lever 156 remains disengaged with the teeth 180 disposed along the interior surface 182 of the cam 106. Specifically, when the BSG system 10 (FIG. 1) is operating in running mode, the biasing force exerted by the clutch spring 158 urges the lever to rotate about the retaining feature 146 of the arm 102 in a direction away from the teeth 180 located around the interior surface 182 of the cam 106.

When the BSG system 10 (FIG. 1) operates in running mode, the arm 102 of the tensioner 100 may still rotate back and forth along the first axis A due to torsional forces created by the engine 20 (FIG. 1), however, the angular accelerations created by the engine 20 may not be significant enough to overcome the biasing force exerted against the end 214 of the lever 156 by the clutch spring 158. Thus, the tip portion 206 of the lever 156 may not engage with one of the teeth 180 located around the interior surface 182 of the cam 106, and the tensioner 100 may operate as a conventional tensioner. The tensioner 100 may provide the required tension force, via the pulley 120, on the endless power transmitting element 21 (FIG. 1) when the engine 20 operates in running mode.

Referring to FIGS. 1 and 9, when the BSG system 10 (FIG. 1) is operating in the cranking mode, the endless power transmitting element 21 (FIG. 1) may urge the tensioner 100 to move about the first axis A in the counterclockwise direction. If the angular accelerations created by the engine 20 are strong enough to overcome the biasing force exerted against the end 214 of the lever 156 by the clutch spring 158, the clutch 108 may engage. Once the clutch 108 is activated or engaged, the lever 156 may now rotate about the retaining feature 146 of the arm 102 in a direction towards the teeth 180 of the cam 106, and the tip portion 206 of the lever 156 (FIG. 7) may engage with one of the teeth 180 located around the interior surface 182 of the cam 106 (FIG. 6). The engagement between the tip portion 206 of the lever 156 and the cam 106 urges the cam 106 to rotate in the counterclockwise direction.

Referring to FIGS. 3-7 and 9-11, as the cam 106 rotates in the counterclockwise direction, the tong 112 may pivot about the first pin 190, and the stop pin 192 of the tong 112 may slide upwardly within the slotted portion 178 of the tensioner case 104. Thus, the pin 192 of the tong 112 may no longer abut against the first end 194 of the slot 170 of the cam 106. Instead, the pin 192 of the tong 112 may now abut against the second end 195 of the slot 170 of the cam 106 (FIG. 9). Indeed, as seen in FIG. 9, the tong 112 is positioned within the slotted portion 178 of the tensioner case 104 to engage with one of the teeth 140 of the arm 102. As soon as the tong 112 engages with one of the teeth 140 of the arm 102, the tensioner 100 is unable to move in the counterclockwise direction about the first axis A.

Referring generally to the figures, once the clutch 108 is activated or engaged, the tensioner 100 may not rotate in the counterclockwise direction about the first axis A. Thus, during start-up of the engine 20, the tensioner 100 is unable to substantially rotate in the counterclockwise direction, and the starter/generator 24 may transmit power effectively to the crankshaft 18 of the engine 20 through the endless power transmitting element 21. After start-up of the engine 20, the tong 112 may eventually be urged in direction away from the teeth 140 of the arm 102 and may abut against the first end 194 of the slot 170 of the cam 106, and the clutch 108 is disengaged. Once the clutch 108 is disengaged, the tensioner 100 may now act as a conventional tensioner to provide the sufficient tension force, via the pulley 120, on the endless power transmitting element 21 when the engine 20 operates in running mode.

The disclosed tensioner 100 provides a cost-effective and efficient approach for meeting the needs of a BSG drive, without the need for duplicate tensioners or a tensioner including multiple arms and pulleys. Multiple tensioners or multiple tensioner components add cost and complexity to the BSG drive. In contrast, the clutch 108 substantially prevents the tensioner 100 from rotating about the first axis A in the counterclockwise direction during start-up of the engine, without requiring duplicate components.

The embodiments of this invention shown in the drawings and described above are exemplary of numerous embodiments that may be made within the scope of the appended claims. It is contemplated that numerous other configurations of the disclosure may be created taking advantage of the disclosed approach. In short, it is the applicant's intention that the scope of the patent issuing herefrom will be limited only by the scope of the appended claims.

What is claimed is:

1. A tensioner comprising:
   an arm rotatable about a first axis in an opposite direction, the arm including at least one stopping element;
   a tong that is selectively engaged with the at least one stopping element of the arm, wherein the arm is substantially prevented from rotating in the opposite direction if the tong is engaged with the at least one stopping element; and
   a clutch operatively coupled to the arm, the clutch including an engaged and a disengaged position, wherein if the clutch is in the engaged position then the tong is engaged with the at least one stopping element of the arm.

2. The tensioner of claim 1, wherein the tong defines a stop pin.

3. The tensioner of claim 2, comprising a cam that defines a slot having a first end and a second end, wherein the stop pin of the tong abuts against the first end of the slot if the clutch is disengaged and the stop pin of the tong abuts against the second end of the slot if the clutch is engaged.

4. The tensioner of claim 1, wherein the arm defines a recess shaped to receive a weight, and the weight encloses interior components of the clutch.

5. The tensioner of claim 4, wherein one of the interior components is a lever, and wherein the lever defines an outward projecting pin and a tip portion.

6. The tensioner of claim 5, wherein the weight defines a slot shaped to receive the projecting pin of the lever.

7. The tensioner of claim 5, comprising a cam that defines a cavity that is shaped to fit around an outer surface of the recess of the arm.

8. The tensioner of claim 7, wherein a plurality of teeth are disposed along an inner surface of the cavity of the cam, and wherein the tip portion of the lever engages with one of the plurality of teeth if the clutch is engaged.

9. The tensioner of claim 8, wherein one of the interior components is a clutch biasing element, and wherein the clutch biasing element exerts a force against an end of the lever such that the tip portion of the lever is disengaged with the plurality of teeth of the cam if the clutch is disengaged.

10. The tensioner of claim 1, wherein the at least one stopping element is a series of teeth disposed along an outer periphery of the arm.

11. A belt-driven starter generator (BSG) system, comprising:
    an engine having a crankshaft;
    a starter/generator;
    an endless power transmitting element for providing power transmission between the crankshaft and the starter/generator, wherein the BSG system includes a running mode and a cranking mode, wherein the starter/generator operates as a starter motor and restarts the engine based on a predetermined engine-start condition in the cranking mode; and
    a tensioner for substantially resisting a motion in an opposite direction created by the endless power transmitting element as the BSG system operates in the cranking mode, the tensioner comprising:
       an arm rotatable about a first axis in the opposite direction, the arm including at least one stopping element;
       a tong that is selectively engaged with the at least one stopping element of the arm, wherein the arm is substantially prevented from rotating in the opposite direction if the tong is engaged with the at least one stopping element; and
       a clutch operatively coupled to the arm, the clutch including an engaged position corresponding to the cranking mode and a disengaged position corresponding to the running mode, wherein if the clutch is in the engaged position then the tong is engaged with the at least one stopping element of the arm.

12. The BSG system of claim 11, wherein the tong defines a stop pin.

13. The BSG system of claim 12, comprising a cam that defines a slot having a first end and a second end, wherein the stop pin of the tong abuts against the first end of the slot if the clutch is disengaged and the stop pin of the tong abuts against the second end of the slot if the clutch is engaged.

14. The BSG system of claim 11, wherein the arm defines a recess shaped to receive a weight, and the weight encloses interior components of the clutch.

15. The BSG system of claim 14, wherein one of the interior components is a lever, and wherein the lever defines an outward projecting pin and a tip portion.

16. The BSG system of claim 15, wherein the weight defines a slot shaped to receive the projecting pin of the lever.

17. The BSG system of claim 15, comprising a cam that defines a cavity that is shaped to fit around an outer surface of the recess of the arm.

18. The BSG system of claim 17, wherein a plurality of teeth are disposed along an inner surface of the cavity of the cam, and wherein the tip portion of the lever engages with one of the plurality of teeth if the clutch is engaged.

19. The BSG system of claim 18, wherein one of the interior components is a clutch biasing element, and wherein the clutch biasing element exerts a force against an end of the lever such that the tip portion of the lever is disengaged with the plurality of teeth of the cam if the clutch is disengaged.

20. The BSG system of claim 11, wherein the at least one stopping element is a series of teeth disposed along an outer periphery of the arm.

* * * * *